US012002285B2

(12) United States Patent
Luiz Leal Chagas do Nascimento et al.

(10) Patent No.: US 12,002,285 B2
(45) Date of Patent: *Jun. 4, 2024

(54) ELECTRONIC DEVICES AND CORRESPONDING METHODS FOR UNLOCKING DISPLAYS AS A FUNCTION OF A DEVICE GEOMETRIC FORM FACTOR

(71) Applicant: Motorola Mobility LLC, Chicago, IL (US)

(72) Inventors: Caio Luiz Leal Chagas do Nascimento, Campinas (BR); Amit Kumar Agrawal, Bangalore (IN); Mahadevan Ayalur, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,334

(22) Filed: Feb. 8, 2023

(65) Prior Publication Data
US 2023/0196822 A1 Jun. 22, 2023

Related U.S. Application Data

(63) Continuation of application No. 17/686,153, filed on Mar. 3, 2022, now Pat. No. 11,600,107, which is a
(Continued)

(51) Int. Cl.
*G06V 40/12* (2022.01)
*G06F 3/041* (2006.01)
(Continued)

(52) U.S. Cl.
CPC .......... *G06V 40/1365* (2022.01); *G06F 3/041* (2013.01); *G06F 21/32* (2013.01); *G06V 40/1318* (2022.01); *G06V 40/67* (2022.01)

(58) Field of Classification Search
CPC .......... G06V 40/1365; G06V 40/1318; G06V 40/67; G06F 3/041; G06F 21/32;
(Continued)

(56) References Cited

U.S. PATENT DOCUMENTS 10,284,759 B2  5/2019  Wang et al.
10,616,460 B2  4/2020  Wang et al.
(Continued)

OTHER PUBLICATIONS

Patel, Premal R. , "NonFinal Office Action", U.S. Appl. No. 17/868,153, filed Mar. 3, 2022; dated Oct. 27, 2022.
(Continued)

*Primary Examiner* — Premal R Patel
(74) *Attorney, Agent, or Firm* — Philip H. Burrus, IV

(57) ABSTRACT

One or more sensors of an electronic device detect a geometric form factor of the electronic device. A fingerprint sensor situated beneath a first display of the electronic device receives fingerprint data. One or more processors authenticate an authorized user of the electronic device using the fingerprint data with one or more processors. The one or more processors select between the first display and a second display of the electronic device as a function of the geometric form factor and unlock the selected display in response to authenticating the authorized user of the electronic device.

20 Claims, 7 Drawing Sheets

Related U.S. Application Data continuation of application No. 17/203,616, filed on Mar. 16, 2021, now Pat. No. 11,302,113.

(51) Int. Cl.
*G06F 21/32* (2013.01)
*G06V 40/13* (2022.01)
*G06V 40/60* (2022.01)

(58) Field of Classification Search
CPC ..... G06F 1/1616; H04M 1/67; H04M 1/0241; H04M 1/0214
See application file for complete search history.

(56) References Cited

U.S. PATENT DOCUMENTS

| | | | |
|---|---|---|---|
| 2010/0188353 A1 | 7/2010 | Yoon et al. | |
| 2015/0078586 A1 | 3/2015 | Ang | |
| 2015/0324570 A1 | 11/2015 | Lee et al. | |
| 2016/0147987 A1 | 5/2016 | Jang | |
| 2017/0017783 A1* | 1/2017 | Willis | G06V 40/70 |
| 2018/0011590 A1 | 1/2018 | Lee et al. | |
| 2019/0012000 A1 | 1/2019 | Cavallaro et al. | |
| 2019/0098187 A1 | 3/2019 | Wang | |
| 2021/0248347 A1 | 8/2021 | Seo | |
| 2021/0368037 A1* | 11/2021 | Zhang | H04M 1/724631 |
| 2021/0409539 A1 | 12/2021 | Arellano et al. | |
| 2022/0284212 A1 | 9/2022 | Pallerla | |
| 2023/0026952 A1 | 1/2023 | Han | |

OTHER PUBLICATIONS

Patel, Premal R., "Notice of Allowance", U.S. Appl. No. 17/203,616, filed Mar. 16, 2021; dated Mar. 2, 2022.
Patel, Premal R., "Notice of Allowance", U.S. Appl. No. 17/868,153, filed Mar. 3, 2022; dated Jan. 13, 2023.
Sarma, Abhishek, "Non-Final Office Action", U.S. Appl. No. 17/686,144, filed Mar. 3, 2022; dated Apr. 4, 2023.
Sarma, Abhishek, "Notice of Allowance", U.S. Appl. No. 17/203,608, filed Mar. 16, 2021; dated Feb. 1, 2022.
Townley, Mandy, "GB Search Report and Written Opinion", GB2203113.2; dated Sep. 16, 2022.
Tyagi, et al., "Image Processing as a Function of Deformable Electronic Device Geometry and Corresponding Devices and Mehtods", U.S. Appl. No. 17/161,573, filed Jan. 28, 2021; Application as filed.
Zhu, Xiafeng, "Electronc Devices and Corresponding Methods for Rotating Graphical Objects Presented on a Display", U.S. Appl. No. 16/517,005, filed Jul. 19, 2019; Application as Filed.
Johnson, Gerald, "Non-FInal Office Action", U.S. Appl. No. 17/203,614, filed Sep. 13, 2023; dated Sep. 13, 2023.
Sarma, Abhishek, "NonFinal Office Action", U.S. Appl. No. 17/686,144, filed Mar. 3, 2022; dated Nov. 2, 2023.

* cited by examiner

ELECTRONIC DEVICES AND CORRESPONDING METHODS FOR UNLOCKING DISPLAYS AS A FUNCTION OF A DEVICE GEOMETRIC FORM FACTOR

CROSS REFERENCE TO PRIOR APPLICATIONS

This application is a continuation application claiming priority and benefit under 35 U.S.C. § 120 from U.S. application Ser. No. 17/686,153, filed Mar. 3, 2022, which is a continuation application claiming priority and benefit under 35 U.S.C. § 120 from U.S. application Ser. No. 17/203,616, filed Mar. 16, 2021, each of which is incorporated by reference for all purposes.

BACKGROUND

Technical Field

This disclosure relates generally to electronic devices, and more particularly to electronic devices having displays.

Background Art

Portable electronic communication devices such as smartphones and tablet computers have become ubiquitous. People all over the world use such devices to stay connected.

These devices have been designed in various mechanical configurations. A first configuration, known as a "candy bar," is generally rectangular in shape and has a rigid form factor with a continually exposed display positioned on a major face of the electronic device. By contrast, a "clamshell" device has a mechanical hinge that allows one housing to pivot relative to the other, thereby concealing its display when closed and revealing the same when open.

Some consumers prefer candy bar devices, while others prefer clamshell devices. To satisfy the latter, it would thus be desirable to have an improved clamshell device with a user interface simplifying control of its display.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
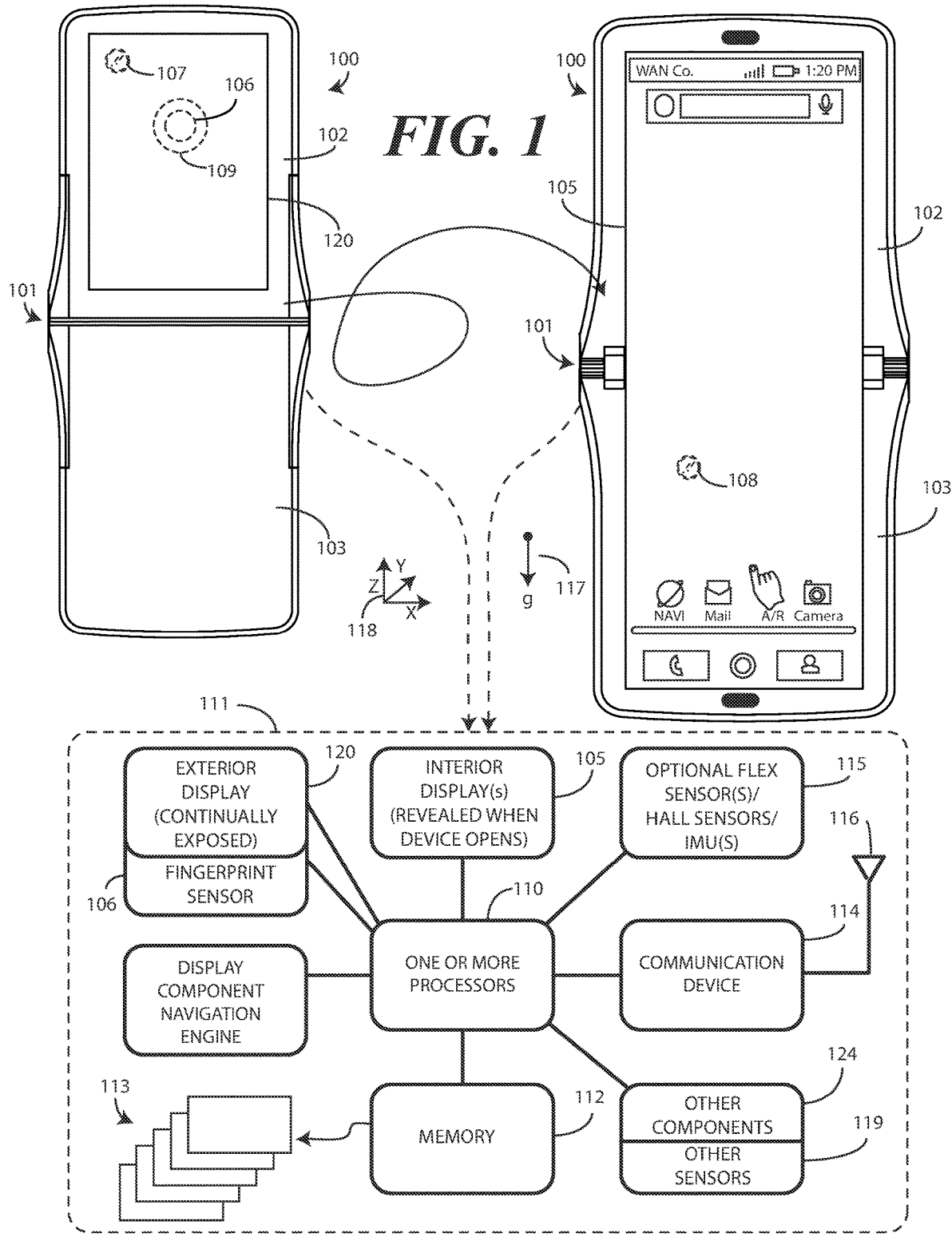
FIG. 1 illustrates one explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to controlling a first display of an electronic device using a fingerprint sensor situated beneath another display of the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of receiving fingerprint data with a fingerprint sensor situated beneath a first display of an electronic device, authenticating an authorized user of the electronic device using the fingerprint data, selecting between the first display and a second display as a function of a geometric form factor of the electronic device, and unlocking the selected display in response to authenticating the authorized user as described herein. The non-processor circuits may include, but are not limited to, a radio receiver, a radio transmitter, signal drivers, clock circuits, power source circuits, and user input devices.

As such, these functions may be interpreted as steps of a method to perform unlocking a second display when a fingerprint sensor situated beneath a first display receives fingerprint data authenticating an authorized user of the electronic device while a first device housing and a second device housing are in an axially displaced open position as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide electronic devices and corresponding methods that allow for the control of one display using a fingerprint sensor situated beneath another display as a function of device geometry. In one or more embodiments, a method in an electronic device includes detecting a geometric form factor of the electronic device, be it a closed position, an axially displaced open position, or another position, using one or more sensors. A fingerprint sensor situated beneath a first display of the electronic device then receives fingerprint data. One or more processors of the electronic device then attempt to authenticate the fingerprint data to determine whether the source of the fingerprint data is an authorized user of the electronic device.

Where the source is an authorized user of the electronic device, in one or more embodiments the one or more processors select between the first display and the second display of the electronic device as a function of the geometric form factor. If, for example, the electronic device is in the closed position, in one or more embodiments the one or more processors select the first display. By contrast, if the electronic device is in the axially displaced open position, in one or more embodiments the one or more processors select the second display.

In one or more embodiments, the one or more processors then unlock the selected display in response to authenticating the authorized user of the electronic device. Advantageously, for clamshell-type electronic devices, a fingerprint sensor can be positioned beneath a display situated on the exterior of the electronic device such that the display is always exposed regardless of the geometric form factor of the electronic device. When the electronic device is in the closed position, an authorized user of the electronic device can deliver fingerprint data to the continually exposed display, and thus to the fingerprint sensor, to unlock the exposed display. However, when the electronic device is in the axially displaced open position with a second display revealed, the authorized user can deliver fingerprint data to the first display to unlock the second display.

In one or more embodiments, an electronic device includes a first device housing that is pivotable relative to a second device housing between a closed position and an axially displaced open position. In one or more embodiments, a first display is coupled to the first device housing such that the first display is exposed both when the first device housing and the second device housing are in the closed position and when the first device housing and the second device housing are in the axially displaced open position. In one or more embodiments, this first display is known as a "quick view display" in that it can be used to provide quick information that is available at a glance to users without the need of pivoting the first device housing and second device housing to the axially displaced open position. In one or more embodiments, a fingerprint sensor is situated beneath this first display.

In one or more embodiments, a second display is then coupled to the first device housing. The second device housing is concealed when the first device housing and the second device housing are in the closed position, but is revealed when the first device housing pivots from the closed position to the axially displaced open position. In one or more embodiments, one or more processors unlock the second display when the fingerprint sensor situated beneath the first display received fingerprint data authenticating an authorized user of the electronic device while the first device housing and the second device housing are in the axially displaced open position.

Advantageously, this provides a solution for unlocking the appropriate display both when the authorized user interacts with the first display and when the user interacts with the second display. Additional benefits provided by embodiments of the disclosure make this fingerprint sensor situated beneath the first display easy to use as well. Embodiments of the disclosure contemplate that when the fingerprint sensor is situated beneath the first display, it may be difficult for a person to locate due to the fact that there is no tactile indication, e.g., a protrusion, indentation, button, or so forth, to feel when the finger moves atop the fingerprint sensor when the electronic device is in the axially displaced open position. Accordingly, in one or more embodiments redirection indicia is presented to the user on the second display when their finger inadvertently misses the area beneath the display where the fingerprint sensor is situated. This redirection indicia, which can comprises a visible marker, one or more images, or navigational instructions, allows the person to quickly and easily find the proper location of the fingerprint sensor positioned under the first display to unlock the second display when the electronic device is in the axially displaced open position.

Embodiments of the disclosure solve problems associated with prior art devices where attempting to use a user authentication device is uncomfortable or difficult. For example, where a fingerprint sensor is used in prior art devices, it is often difficult to reach in certain situations. It can further be difficult to interact with the fingerprint sensor in certain conditions. These problems can arise when the fingerprint sensor is configured as a separate component situated along a device housing. These problems can also arise when the fingerprint sensor is configured as a button or other feature positioned on a minor face of the electronic device.

By placing the fingerprint sensor beneath one display, and advantageously allowing it to control a second display, embodiments of the disclosure allow the exterior display to be quickly and easily unlocked when the electronic device is in the closed position, while also allowing the second display to be quickly and easily unlocked when the electronic device is in the axially displaced open position. In one or more embodiments, when redirection indicia is provided on the second display as one or more images captured by an imager collocated with the first display, the redirection indicia serves as a virtual "x-ray window" that allows a person to virtually look "through" the electronic device to determine where to position their finger to unlock the second display. This x-ray window, which is presented when the electronic device is in the locked mode in one or more embodiments, provides instantaneous and accurate feedback with respect to touch interactions occurring on the first display. It further indicates the target touch occurring on the first display by showing the same on the second display. Embodiments of the disclosure also reduce the overall cost of manufacturing the electronic device in that one fingerprint sensor can be used to control two displays, rather than requiring two separate fingerprint sensors.

Thus, embodiments of the disclosure provide a fingerprint sensor situated beneath a first display that can be used to not only unlock the display beneath which it is situated, but also to unlock another display as well. The benefits provided by embodiments of the disclosure include the fact that it solves a usability issue that is problematic in prior art devices. Additionally, it provides a more economical solution in that it requires only one fingerprint sensor rather than two. Moreover, embodiments of the disclosure solve a form-factor intrinsic usability challenge, thereby adding value to the electronic devices employing such embodiments. Other advantages and benefits of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 3, a partially open position, shown and described below with reference to FIG. 4, and the open position shown in FIG. 1

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, the electronic device 100 will be bendable, but will not include a hinge 101, such as when the first device housing 102 and the second device housing 103 are manufactured from bendable materials. In still other embodiments, the electronic device 100 can be bendable via a combination of hinge components and non-hinge components.

Illustrating by example, in another embodiment the electronic device housing can exclude a hinge and instead be flexible with a bending region that allows the electronic device housing to bend and flex between the axially displaced open position and the closed position. In such an embodiment, the electronic device housing may be manufactured from a malleable, bendable, or physically deformable material such as a flexible thermoplastic, flexible composite material, flexible fiber material, flexible metal, organic or inorganic textile or polymer material, or other materials. The electronic device housing could be formed from a single flexible housing member or from multiple flexible housing members.

In other embodiments, the electronic device housing could be a composite of multiple components. For instance, in another embodiment the electronic device housing could be a combination of rigid segments connected by hinges or flexible materials. Still other constructs will be obvious to those of ordinary skill in the art having the benefit of this disclosure.

In one or more embodiments the electronic device 100 of FIG. 1 includes at least one display 105. The illustrative embodiment of FIG. 1 includes multiple displays. Display 105 serves as a first display, and is also referred to as the interior display or the rear-facing display. Display 105 is concealed when the first device housing 102 is pivoted about the hinge 101 relative to the second device housing 103 to a closed position. Illustrating by example, display 105 is concealed in FIG. 3 below. Display 105 is then revealed when the first device housing 102 is pivoted about the hinge 101 relative to the second device housing 103 from the closed position to an axially displaced open position shown in FIG. 1. Thus, display 105 is revealed as the electronic device 100 transitions from the closed position of FIG. 3 to the open position of FIG. 1.

The electronic device 100 can optionally include at least one additional display. In the illustrative embodiment of FIG. 1, the electronic device 100 includes a front display 120, which can be referred to as an exterior display or front-facing display. This nomenclature arises due to the fact that the front display 120 is exposed both when the first device housing 102 and the second device housing 103 are pivoted about the hinge 101 to the closed position or the axially displaced open position. Thus, the front display 120 is exposed both in the axially displaced open position of FIG. 1 and the closed position of FIG. 3. In one or more embodiments, each of the rear display 105 and the front display 120 is a high-resolution display.

While shown coupled to the first device housing 102, it should be noted that the front display 120 could be coupled to either of the first device housing 102 or the second device housing 103. In other embodiments, the front display 120 can be coupled to the first device housing 102, while a third display (not shown) is coupled to the second device housing 103, and so forth. Thus, electronic devices configured in accordance with embodiments of the disclosure can include displays situated at different positions.

As with the front display 120, display 105 can also be coupled to either or both of the first device housing 102 or the second device housing 103. In this illustrative embodiment, display 105 is coupled to both the first device housing 102 and the second device housing 103 and spans the hinge 101. As noted above, display 105 is considered to be an "interior" display because it is concealed when the first device housing 102 and the second device housing 103 are in the closed position.

In one or more embodiments, either or both of display 105 or front display 120 can be touch-sensitive. Where this is the case, users can deliver user input to one or both of display 105 or the front display 120 by delivering touch input from a finger, stylus, or other objects disposed proximately with display 105 or the front display 120.

In the illustrative embodiment of FIG. 1, since display 105 spans the hinge 101, it is configured as a flexible display that can bend, deflect, and deform into different shapes. For instance, in one embodiment display 105 is configured as a foldable organic light emitting diode (OLED) display coupled to a foldable substrate. The foldable substrate can be manufactured from various materials, including flexible plastic layers, flexible metal layers, flexible composite layers, or of other materials. In one embodiment, the foldable substrate is manufactured from stainless steel. Others will be obvious to those of ordinary skill in the art having the benefit of this disclosure. Where manufactured with a foldable substrate, this substrate allows display 105 to be flexible so as to deform when the first device housing 102 pivots about the hinge 101 relative to the second device housing 103.

In one or more embodiments, a user interface component, which may be a button or touch sensitive surface, can also be disposed along one or both of the first device housing 102 and/or the second device housing 103 to facilitate control of the electronic device 100. In the illustrative embodiment of FIG. 1, the user interface component comprises a fingerprint sensor 106 positioned under the front display 120 of the electronic device 100. In other embodiments, the user interface component will be placed to the side of the front display 120, rather than beneath the front display 120.

Other features can be added and can be located on the front of one or both of the first device housing 102 and/or the second device housing 103, sides of one or both of the first device housing 102 and/or the second device housing 103, and/or the rear of one or both of the first device housing 102 and/or the second device housing 103. Illustrating by example, in one or more embodiments a first image capture device 107 can be disposed on one side of the electronic device 100, while a second image capture device 108 is disposed on another side of the electronic device 100. In the illustrative embodiment of FIG. 1, each of the first image capture device 107 and the second image capture device 108 is positioned beneath the front display 120 and the rear display 105, respectively. However, in other embodiments, the first image capture device 107 and the second image capture device 108 could be placed beside the their respective displays, rather than beneath the same. Of course, a combination of beside/beneath placements can be used as well.

In this illustrative embodiment, each of image capture device 107 and image capture device 108 is positioned beneath a display. In one or more embodiments, one or both of the rear display 105 and/or the front display 120 includes a first pixel portion and a second pixel portion. Using the front display 120 as an illustrative example, a first pixel portion (the area of display 120 within circle 109) is situated above fingerprint sensor 106 (with another first pixel portion situated above image capture device 107) and a second pixel portion (the area of display 120 outside circle 109) situated at areas of the display 120 other than those positioned above the fingerprint sensor 106 and the image capture device 107. The rear display 105 can be similarly configured, with a first pixel portion situated above image capture device 108 and a second pixel portion situated at areas of the display 105 other than those positioned above the and the image capture device 108.

In one embodiment, the first pixel portion comprises only transparent organic light emitting diode pixels. In another embodiment, the pixels disposed in the first pixel portion comprise a combination of transparent organic light emitting diode pixels and reflective organic light emitting diode pixels. Other configurations will be obvious to those of ordinary skill in the art having the benefit of this disclosure.

In one or more embodiments, the entire extent of the displays 105,120 is available for presenting images. While some borders are shown in FIG. 1, in other embodiments there is no need for the first device housing 102 or the second device housing 103 of the electronic device 100 to include borders that picture frame the rear display 105 or the second device housing 103. To the contrary, in one or more embodiments one or both of the rear display 105 and/or the front display 120 can span an entire major face of the electronic device 100 so that the entirety of the major face can be used as active display area.

One way that the amount of surface area of the first device housing 102 and the second device housing 103 covered by the rear display 105 or the front display 120 can be expanded is by placing the various sensors, e.g., image capture devices 107,108 and the fingerprint sensor 106, beneath the first pixel portion such that the fingerprint sensor 106, the image capture devices 107,108, and/or any other sensors are collocated with the first pixel portion or portions. This allows the fingerprint sensor 106, the image capture devices 107, 108, and/or the other sensors to receive signals through the transparent portions of the first pixel portion.

In one or more embodiments, the second pixel portion comprises only reflective light emitting diode pixels. Content can be presented on a first pixel portion comprising only transparent organic light emitting diode pixels or sub-pixels or a combination of transparent organic light emitting diode pixels or sub-pixels and reflective organic light emitting diode pixels or sub-pixels. The content can also be presented on the second pixel portion comprising only the reflective organic light emitting diode pixels or sub-pixels.

When a user desires to capture an image with either or both of image capture device 107 or image capture device 108, or when touch input delivering fingerprint data to the fingerprint sensor 106 is detected upon the front display 120, one or more processors 110 of the electronic device 100 cause the transparent organic light emitting diode pixels or sub-pixels to cease emitting light in one or more embodiments. This cessation of light emission prevents light emitted from the transparent organic light emitting diode pixels or sub-pixels from interfering with light or fingerprint data incident upon the first pixel portion. When the transparent organic light emitting diode pixels or sub-pixels are turned OFF, they become optically transparent in one or more embodiments.

In some embodiments, the second pixel portion will then remain ON when the first pixel portion ceases to emit light. However, in other embodiments the second pixel portion will be turned OFF as well. The requisite image capture device 107,108 or the fingerprint sensor 106 can then be actuated to capture the fingerprint data and/or an image from the light passing through the transparent organic light emitting diode pixels or sub-pixels. Thereafter, the one or more processors 110 can resume the presentation of data along the first pixel portion of the display 105,120. In one or more embodiments, this comprises actuating the transparent organic light emitting diode pixels or sub-pixels, thereby causing them to again begin emitting light.

A block diagram schematic 111 of the electronic device 100 is also shown in FIG. 1. In one or more embodiments, the block diagram schematic 111 is configured as a printed circuit board assembly disposed within one or both of the first device housing 102 or the second device housing 103. Various components can be electrically coupled together by conductors or a bus disposed along one or more printed circuit boards, which can optionally be flexible circuit boards or alternatively rigid circuit boards coupled together by one or more flexible conductors or substrates. It should be noted that the block diagram schematic 111 includes many components that are optional, but which are included in an effort to demonstrate how varied electronic devices configured in accordance with embodiments of the disclosure can be.

Thus, it is to be understood that the block diagram schematic 111 of FIG. 1 is provided for illustrative purposes only and for illustrating components of one electronic device 100 in accordance with embodiments of the disclosure. The block diagram schematic 111 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one embodiment, the electronic device 100 includes one or more processors 110. The one or more processors 110 can be a microprocessor, a group of processing components, one or more Application Specific Integrated Circuits (ASICs), programmable logic, or other type of processing device. The one or more processors 110 can be operable with the various components of the electronic device 100. The one or more processors 110 can be configured to process and execute executable software code to perform the various functions of the electronic device 100. A storage device, such as memory 112, can optionally store the executable software code used by the one or more processors 110 during operation.

In one or more embodiments, the one or more processors 110 are responsible for transitioning the electronic device 100 from a locked mode of operation to an active mode of operation. In one or more embodiments, the electronic device 100 includes a security mechanism that places the electronic device 100 in a locked mode of operation to prevent unauthorized users from accessing the electronic device 100 or the data stored in the memory 112. Accordingly, in one or more embodiments the electronic device 100 can be referred to as a "lockable device" in that the one or more processors 110 can selectively actuate a security mechanism that prevents unauthorized persons from accessing or logging on to the electronic device 100. Examples of such mechanisms include password protected login screens, screensavers, voice command login mechanism using voice recognition, voice password entry, and so forth. In the illustrative embodiment of FIG. 1, the security mechanism includes authentication of an authorized user of the electronic device 100 using the fingerprint sensor 106, as will be described in more detail below. Other examples of security mechanisms will be obvious to those of ordinary skill in the art having the benefit of this disclosure.

In the illustrative embodiment of FIG. 1, the electronic device 100 is a lockable device capable of being transitioned between a locked mode of operation and an active mode of operation. The electronic device 100 includes the fingerprint sensor 106. A person can authenticate themselves as an authorized user of the electronic device 100 by delivering fingerprint data to the fingerprint sensor 106 for authentication by the one or more processors 110. Using the fingerprint sensor 106, the one or more processors 110 can detect fingerprint data when a person places their finger upon the front display 120 at a location situated atop the fingerprint sensor 106. The one or more processors 110 can then compare this received fingerprint data with one or more fingerprint data reference files 113 stored in the memory 112 of the electronic device 100 to determine whether the fingerprint data sufficiently matches one of the one or more fingerprint data reference files 113. Where it does, the one or more processors 110 can transition the electronic device 100 from a locked mode of operation to an active mode of operation. In one or more embodiments, this includes causing the presentation of content to occur on one or both of the rear display 105 and/or the front display 120 when the electronic device 100 is in the active mode of operation.

In one or more embodiments, the one or more processors 110 are further responsible for performing the primary functions of the electronic device 100. For example, in one embodiment the one or more processors 110 comprise one or more circuits operable to present presentation information, such as images, text, and video, on one or both of the rear display 105 and/or the front display 120. The executable software code used by the one or more processors 110 can be configured as one or more modules stored in the memory 112 that are operable with the one or more processors 110. Such modules can store instructions, control algorithms, and so forth.

In one embodiment, the one or more processors 110 are responsible for running the operating system environment. The operating system environment can include a kernel, one or more drivers, and an application service layer, and an application layer. The operating system environment can be configured as executable code operating on one or more processors or control circuits of the electronic device 100.

In one or more embodiments, the one or more processors 110 are responsible for managing the applications of the electronic device 100. In one or more embodiments, the one or more processors 110 are also responsible for launching, monitoring and killing the various applications and the various application service modules. The applications of the application layer can be configured as clients of the application service layer to communicate with services through application program interfaces (APIs), messages, events, or other inter-process communication interfaces.

In one or more embodiments, the fingerprint sensor 106 situated beneath the front display 120 is operable with the one or more processors 110. In one embodiment, the fingerprint sensor 106 includes its own processor to perform various functions, including detecting a finger touching the front display 120 atop the fingerprint sensor 106, capturing and storing fingerprint data from the finger, detecting user actions across a surface of the second device housing 103 situated atop the fingerprint sensor 106. The processor of the fingerprint sensor 106 can optionally perform at least one pre-processing step while the one or more processors 110 are in a low power or sleep mode in the locked mode of operation. Upon receiving a request from the one or more processors 110 for the fingerprint data, the fingerprint sensor 106 can deliver the fingerprint data to the one or more processors 110. In one or more embodiments the processor of the fingerprint sensor 106 can, as one pre-processing step, perform a preliminary authentication of the user by comparing fingerprint data captured by the fingerprint sensor 106 to a fingerprint data reference file 113 stored in the memory 112. The processor of the fingerprint sensor 106 can be an on-board processor. Alternatively, the processor can be a secondary processor that is external to, but operable with, the fingerprint sensor in another embodiment. Other configurations will be obvious to those of ordinary skill in the art having the benefit of this disclosure.

In one embodiment, the fingerprint sensor 106 can include a plurality of sensors. The fingerprint sensor 106 can be a complementary metal-oxide-semiconductor active pixel sensor digital imager or any other fingerprint sensor. The fingerprint sensor 106 can be configured to capture, with the plurality of sensors, a live scan of a fingerprint pattern from a finger disposed along its surface, and to store this information as fingerprint data from the user's finger. The fingerprint sensor 106 may also be able to capture one or more images with the plurality of sensors. The images can correspond to an area beneath a surface of skin. The fingerprint sensor 106 can compare the fingerprint data or skin images to one or more fingerprint data reference files 113 to authenticate a user in an authentication process.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 116.

In one embodiment, the electronic device 100 includes one or more sensors 115 operable to determine a geometric form factor of the electronic device 100. Illustrating by example, in one or more embodiments the one or more sensors 115 operable to detect the geometric form factor of the electronic device 100 detect angles between the first device housing 102 and the second device housing 103 as these device housings pivot relative to each other about the hinge 101. The one or more sensors 115 operable to determine a geometric form factor of the electronic device 100 can detect the first device housing 102 pivoting about the hinge 101 relative to the second device housing 103. The one or more sensors 115 operable to determine the geometric form factor can take various forms.

In one or more embodiments, the one or more sensors 115 operable to determine the geometric form factor of the electronic device 100 comprise one or more flex sensors supported by the first device housing 102 and/or second device housing 103 and operable with the one or more processors 110 to detect a bending operation deforming the electronic device 100 into a deformed geometric form factor, examples of which are shown below in FIGS. 3 and 4. The inclusion of flex sensors is optional, and in some embodiment flex sensors will not be included.

Where included, in one embodiment the flex sensors each comprise passive resistive devices manufactured from a material with an impedance that changes when the material is bent, deformed, or flexed. By detecting changes in the impedance as a function of resistance, the one or more processors 110 can use the one or more flex sensors to detect bending or flexing. In one or more embodiments, each flex sensor comprises a bi-directional flex sensor that can detect flexing or bending in two directions. In one embodiment, the one or more flex sensors have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors 110 can detect this change to determine an amount of bending. Taps can be added along each flex sensor to determine other information, including the number of folds, the degree of each fold, the location of the folds, the direction of the folds, and so forth. The flex sensor can further be driven by time-varying signals to increase the amount of information obtained from the flex sensor as well.

While a multi-layered device as a flex sensor is one configuration suitable for detecting a bending operation occurring to deform the electronic device 100 and a geometric form factor of the electronic device 100 after the bending operation, other sensors 115 for detecting the geometric form factor of the electronic device 100 can be used as well. For instance, a magnet can be placed in the first device housing 102 while a magnetic sensor is placed in the second device housing 103, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more sensors 115 operable to determine a geometric form factor of the electronic device 100 can comprise an inductive coil placed in the first device housing 102 and a piece of metal placed in the second device housing 103, or vice versa. When the metal is in close proximity to the coil, the one or more sensors 115 operable to determine the geometric form factor of the electronic device 100 detect the first device housing 102 and the second device housing 103 in a first position. By contrast, when the metal is farther away from the coil, the one or more sensors 115 operable to determine a geometric form factor of the electronic device 100 can detect the first device housing 102 and the second device housing 103 being in a second position, and so forth.

In other embodiments the one or more sensors 115 operable to determine a geometric form factor of the electronic device 100 can comprise an inertial motion unit situated in the first device housing 102 and another inertial motion unit situated in the second device housing 103. The one or more processors 110 can compare motion sensor readings from each inertial motion unit to track the relative movement and/or position of the first device housing 102 relative to the second device housing 103, as well as the first device housing 102 and the second device housing 103 relative to the direction of gravity 117. This data can be used to determine and or track the state and position of the first device housing 102 and the second device housing 103 directly as they pivot about the hinge 101, as well as their orientation with reference to a direction of gravity 117.

Where included as the one or more sensors 115 operable to determine the geometric form factor of the electronic device 100, each inertial motion unit can comprise a combination of one or more accelerometers, one or more gyroscopes, and optionally one or more magnetometers, to determine the orientation, angular velocity, and/or specific force of one or both of the first device housing 102 or the second device housing 103. When included in the electronic device 100, these inertial motion units can be used as orientation sensors to measure the orientation of one or both of the first device housing 102 or the second device housing 103 in three-dimensional space 118. Similarly, the inertial motion units can be used as orientation sensors to measure the motion of one or both of the first device housing 102 or second device housing 103 in three-dimensional space 118. The inertial motion units can be used to make other measurements as well.

Where only one inertial motion unit is included in the first device housing 102, this inertial motion unit is configured to determine an orientation, which can include measurements of azimuth, plumb, tilt, velocity, angular velocity, acceleration, and angular acceleration, of the first device housing 102. Similarly, where two inertial motion units are included, with one inertial motion unit being situated in the first device housing 102 and another inertial motion unit being situated in the second device housing 103, each inertial motion unit determines the orientation of its respective device housing. Inertial motion unit can determine measurements of azimuth, plumb, tilt, velocity, angular velocity, acceleration, angular acceleration, and so forth of the first device housing 102, while inertial motion unit can determine measurements of azimuth, plumb, tilt, velocity, angular velocity, acceleration, angular acceleration, and so forth of the second device housing 103, and so forth.

In one or more embodiments, each inertial motion unit delivers these orientation measurements to the one or more processors 110 in the form of orientation determination signals. Thus, the inertial motion unit situated in the first device housing 102 outputs a first orientation determination signal comprising the determined orientation of the first device housing 102, while the inertial motion unit situated in the second device housing 103 outputs another orientation determination signal comprising the determined orientation of the second device housing 103.

In one or more embodiments, the orientation determination signals are delivered to the one or more processors 110, which report the determined orientations to the various modules, components, and applications operating on the electronic device 100. In one or more embodiments, the one or more processors 110 can be configured to deliver a composite orientation that is an average or other combination of the orientation of orientation determination signals. In other embodiments, the one or more processors 110 are configured to deliver one or the other orientation determination signal to the various modules, components, and applications operating on the electronic device 100.

In another embodiment the one or more sensors 115 operable to determine the geometric form factor of the electronic device 100 comprise proximity sensors that detect how far a first end of the electronic device 100 is from a second end of the electronic device 100. Still other examples of the one or more sensors 115 operable to determine a geometric form factor of the electronic device 100 will be obvious to those of ordinary skill in the art having the benefit of this disclosure.

In one or more embodiments, the one or more sensors 115 operable to determine the geometric form factor of the electronic device 100 can comprise an image capture analysis/synthesis manager. When the electronic device 100 is bent at the hinge 101, with an image capture device 107 situated on the first device housing 102 positioned to a first side of the bend, and image capture device 108 situated on the second device housing 103 positioned to the second side of the bend, the image capture analysis/synthesis manager can detect that the field of view of image capture device 107 and the field of view of image capture device 108 converging or diverging depending upon the angle of the bend, and can determine the geometric form factor by processing images from image capture device 107 and image capture device 108 to determine the angle of the bend.

In one or more embodiments, each of the first image capture device 107 and the second image capture device 108 comprises an intelligent imager. Where configured as an intelligent imager, each image capture device 107,108 can capture one or more images of environments about the electronic device 100 and determine whether the object matches predetermined criteria. For example, the intelligent imager operate as an identification module configured with optical recognition such as include image recognition, character recognition, visual recognition, facial recognition, color recognition, shape recognition and the like. In yet another embodiment, the intelligent imager can determine where a user's eyes or face are located in three-dimensional space relative to the electronic device 100.

In addition to, or instead of the intelligent imager, one or more proximity sensors included with the other sensors 119 can determine to which side of the electronic device 100 the user is positioned when the electronic device 100 is deformed. The proximity sensors can include one or more proximity sensor components. The proximity sensors can also include one or more proximity detector components. In one embodiment, the proximity sensor components comprise only signal receivers. By contrast, the proximity detector components include a signal receiver and a corresponding signal transmitter.

In one embodiment, the proximity sensor components comprise an infrared signal receiver so as to be able to detect infrared emissions from a person. Accordingly, the proximity sensor components require no transmitter since objects disposed external to the electronic device 100 deliver emissions that are received by the infrared receiver. As no transmitter is required, each proximity sensor component can operate at a very low power level.

In one embodiment, one or more proximity detector components can each include a signal receiver and a corresponding signal transmitter. The signal transmitter can transmit a beam of infrared light that reflects from a nearby object and is received by a corresponding signal receiver. The proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more processors 110 may generate commands or execute control operations based on information received from the various sensors 119 and other components 124, including the one or more sensors 115 operable to determine the geometric form factor of the electronic device 100, the first image capture device 107, the second image capture device 108, or other components of the electronic device. The one or more processors 110 may also generate commands or execute control operations based upon information received from a combination of these components. Moreover, the one or more processors 110 may process the received information alone or in combination with other data, such as the information stored in the memory 112.

The other sensors 119 and other components 124 may include a microphone, an earpiece speaker, a loudspeaker, key selection sensors, a touch pad sensor, a touch screen sensor, a capacitive touch sensor, and one or more switches. Touch sensors may be used to indicate whether any of the user actuation targets present on the rear display 105 are being actuated. Alternatively, touch sensors can determine if the front display 120 is being touched to determine whether fingerprint data is being delivered to the fingerprint sensor 106. The touch sensors can include surface and/or housing capacitive sensors in one embodiment.

The other sensors 119 and components 124 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion. In one embodiment the motion detectors are also operable to detect movement, and direction of movement, of the electronic device 100 by a user.

In one or more embodiments, the other sensors 119 and components 124 include a gravity detector. For example, as one or more accelerometers and/or gyroscopes may be used to show vertical orientation, constant, or a measurement of tilt relative to gravity 117. Accordingly, in one or more embodiments, the one or more processors 110 can use the gravity detector to determine an orientation of the electronic device 100 in three-dimensional space 118 relative to the direction of gravity 117.

The other sensors 119 and components 124 operable with the one or more processors 110 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
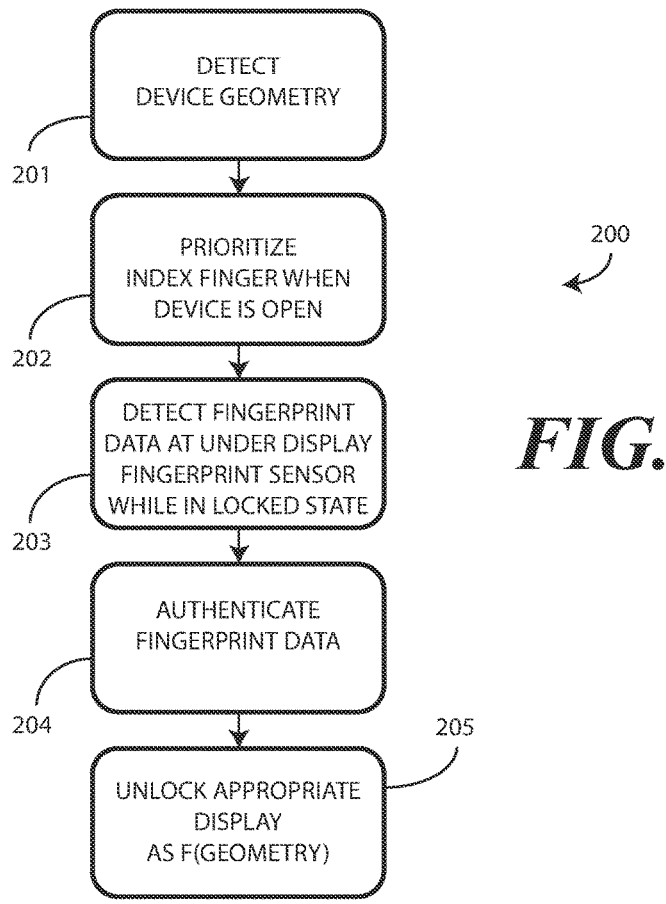
FIG. 2 illustrates one explanatory method in accordance with one or more embodiments of the disclosure.

Now that the various hardware components have been described, attention will be turned to methods, systems, and use cases in accordance with one or more embodiments of the disclosure. Beginning with FIG. 2, illustrated therein is one explanatory method 200 configured in accordance with one or more embodiments of the disclosure. The method 200, when implemented on an electronic device such as the electronic device (100) of FIG. 1, facilitates the unlocking of the rear display (105) when fingerprint data authenticates an authorized user of the electronic device (100) and the first device housing (102) and the second device housing (103) are pivoted to the axially displaced open position. However, when the first device housing (102) and the second device housing (103) are pivoted to the closed position, the method 200 facilitates the unlocking of the front display (120) when the fingerprint data authenticates an authorized user of the electronic device (100).

Beginning at step 201, in one or more embodiments the method 200 includes detecting a geometric form factor of the electronic device using one or more sensors. Examples of geometric form factors that are capable of detection include the axially displaced open position shown in FIG. 1, the closed position shown in FIG. 3, and one or more partially open positions, one example of which is shown in FIG. 4. Other examples of geometric form factors capable of detection will be obvious to those of ordinary skill in the art having the benefit of this disclosure.

At step 202, the method 200 optionally includes prioritizing which finger the fingerprint sensor of the electronic device will initially attempt to authenticate as a function of the geometric form factor. Recall from above that in one or more embodiments one or more processors of the electronic device attempt to authenticate fingerprint data as belonging to an authorized user of the electronic device by comparing the fingerprint data with one or more fingerprint data reference files stored in the memory of the electronic device. Embodiments of the disclosure contemplate that when a person is holding the electronic device in the axially displaced open position while viewing the primary display, with the fingerprint sensor situated under the secondary display situated on the other side of the electronic device, it is far more likely that they will use an index finger to unlock the electronic device than, say, a thumb. By contrast, when the electronic device is in the closed position, the person may be equally likely to use an index finger or a thumb, depending upon how the electronic device is being held.

To streamline the authentication process and make it more efficient, in one or more embodiments step 202 comprises prioritizing which fingerprint data reference file will initially be used in the comparison with the fingerprint data. Illustrating by example, in one or more embodiments step 202 comprises comparing the fingerprint data with a forefinger fingerprint data reference file stored in a memory of the electronic device before comparing the fingerprint data to any other fingerprint reference data files stored in the memory whenever the first device housing and the second device housing are in the axially displaced open position. Step 202 can also comprise comparing the fingerprint data with a thumb fingerprint data reference file stored in a memory of the electronic device before comparing the fingerprint data to any other fingerprint reference data files stored in the memory whenever the first device housing and the second device housing are in the closed position. This allows for prioritization of which finger the fingerprint sensor is "looking for" as a function of the geometric form factor determined at step 201.

At step 203, the fingerprint sensor of the electronic device situated beneath the exterior display of the electronic device receives fingerprint data. In one or more embodiments, step 203 occurs while the electronic device is in a locked mode of operation. In one or more embodiments, step 203 comprises the fingerprint sensor storing the captured fingerprint data in a memory of the electronic device. In one or more embodiments, step 203 comprises monitoring the area of the exterior display situated above the fingerprint sensor to detect a finger proximately located with the exterior display at a location collocated with the fingerprint sensor.

At step 204, the method 200 includes the one or more processors of the electronic device authenticating an authorized user of the electronic device using the fingerprint data received at step 203. In one or more embodiments, the authenticating occurring at step 204 comprises comparing the fingerprint data received at step 203 with one or more fingerprint data reference files stored within a memory of the electronic device to determine whether the fingerprint data substantially matches a fingerprint data reference file. When optional step 202 is included, step 204 can comprise comparing the fingerprint data with a forefinger fingerprint data reference file stored in a memory of the electronic device before comparing the fingerprint data to any other fingerprint reference data files stored in the memory whenever the first device housing and the second device housing are in the axially displaced open position, and so forth.

Step 204 can optionally comprise the fingerprint sensor pre-processing the fingerprint data. Examples of pre-processing steps include noise filtering the fingerprint data and/or validating whether an object proximately located with the exterior display atop the fingerprint sensor is actually a finger rather than another inanimate object such as a key ring, lipstick case, or other object.

Step 204 can optionally image validation as well. The image validation can include determining if the fingerprint data is of sufficient quality so as to successfully make it through the matching and control steps occurring at step 204 and at step 205. In other embodiments, where multiple sets of the fingerprint data are captured at step 203, the image validation of step 204 can include comparing the second object or fingerprint data to primary object or fingerprint data and deleting a lesser quality one of the second object or fingerprint data and the primary object or fingerprint data.

Step 205 then comprises selecting between the exterior display of the electronic device, which is exposed in all geometric form factors of the electronic device, and the other display of the electronic device, which is concealed in at least one geometric form factor of the electronic device. In one or more embodiments, the selecting occurring at step 205 comprises making the selection as a function of the geometric form factor determined at step 201.

Illustrating by example, where the electronic device includes a first device housing that is pivotable relative to a second device housing between an axially displaced open position and a closed position, with a first display coupled to the first device housing such that it is exposed both in the axially displaced open position and in the closed position, and with a second display that is concealed in the closed position but revealed in the axially displaced open position, step 205 can comprise selecting the first display when the electronic device is in the closed position and selecting the second display when the electronic device is in the axially displaced open position. Thereafter, step 205 comprises unlocking the selected display in response to authenticating the authorized user of the electronic device using the fingerprint data at step 203.

Figure 3:
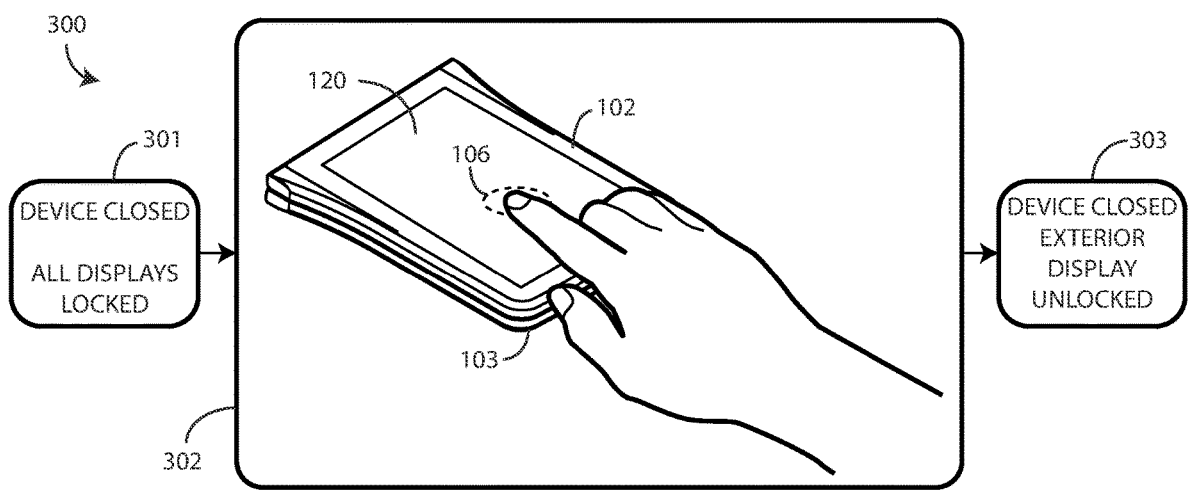
FIG. 3 illustrates one or more explanatory method steps in accordance with one or more embodiments of the disclosure.
Figure 4:
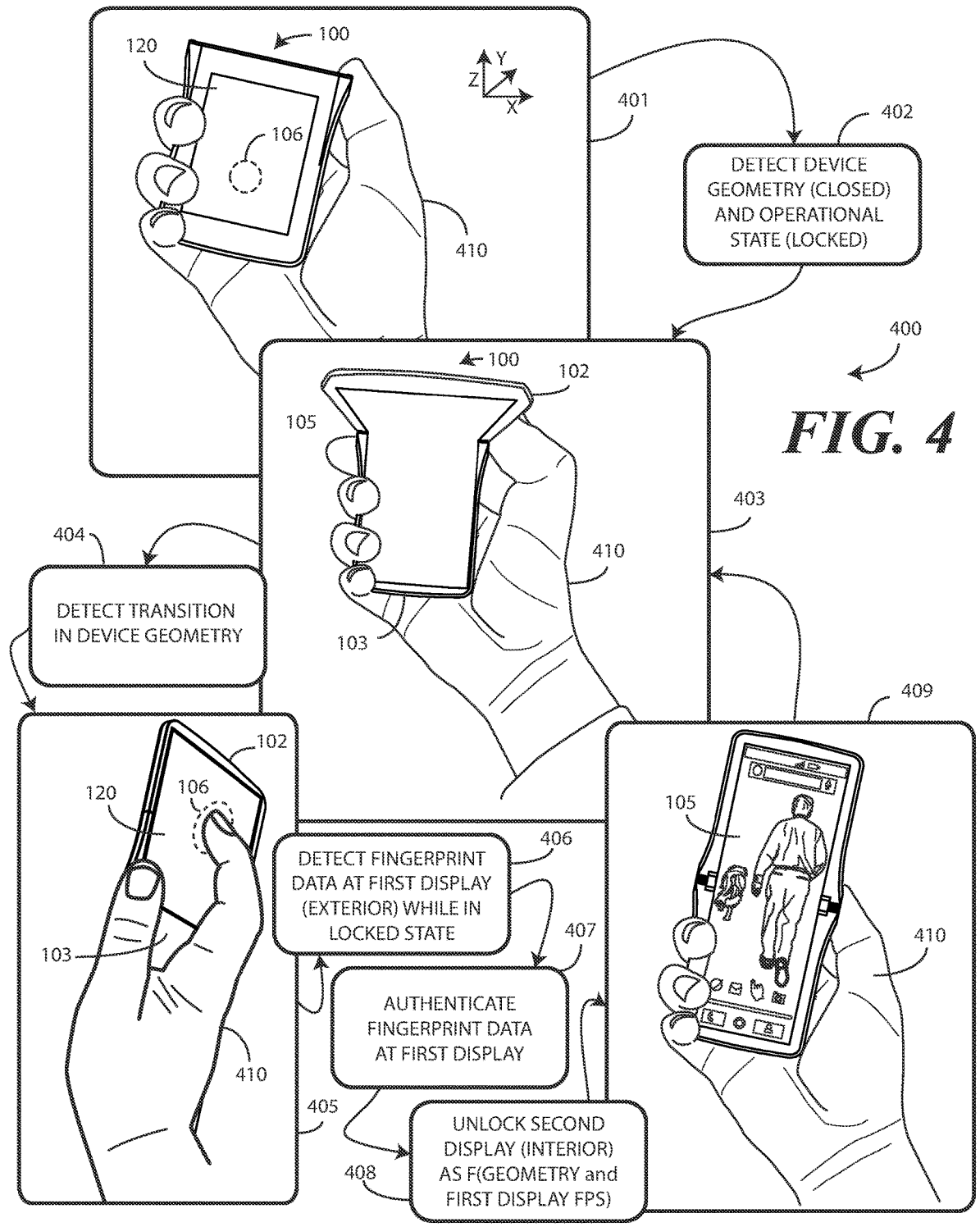
FIG. 4 illustrates one or more explanatory method steps in accordance with one or more embodiments of the disclosure.

One example of the method 200 of FIG. 2 in practice is shown in FIG. 3. Turning now to FIG. 3, at step 301 the electronic device 100 is in the closed position and in the locked mode of operation. In one or more embodiments, one or more sensors (115) of the electronic device detect this geometric form factor at step 301.

As shown at step 302, in one or more embodiments the electronic device 100 includes a display 120 that is exposed for all geometric form factors. A fingerprint sensor 106 is situated beneath this display 120. At step 302, the fingerprint sensor 106 situated beneath the display 120 receives fingerprint data from a finger touching the display 120 at a location that is collocated with the fingerprint sensor 106.

One or more processors (110) of the electronic device then authenticate this fingerprint data at step 302. The one or more processors (110) further select between the display 120 shown in FIG. 3 and the other display of the electronic device 100, which was referenced as the rear display (105) in the description of FIG. 1. In one or more embodiments, the one or more processors (110) select between the display 120 shown in FIG. 3 and the other display as a function of the geometric form factor determined at step 301.

In this illustrative embodiment, the electronic device 100 comprises a first device housing 102 that is pivotable relative to a second device housing 103 between the closed position shown in FIG. 3 and the axially displaced open position of FIG. 1. Here, since first device housing 102 and the second device housing 103 of the electronic device 100 are pivoted to the closed position, at step 302 the one or more processors (110) select the display 120 shown in FIG. 3.

At step 303, the one or more processors (110) transition the electronic device 100 from the locked mode of operation to an active mode of operation. In one or more embodiments, this comprises the one or more processors (110) of the electronic device 100 unlocking the selected display, here display 120, in response to authenticating the authorized user of the electronic device. In one or more embodiments, the one or more processors (110) of the electronic device 100 unlock the selected display without unlocking other displays of the electronic device 100. For instance, in one or more embodiments step 303 comprises the one or more processors (110) of the electronic device 100 unlocking display 120 without unlocking display (105) whenever the electronic device 100 is in the closed position.

Advantageously, the method 300 depicted in FIG. 3 allows an authorized user of the electronic device to simply touch the exterior display with a finger to unlock the electronic device 100, which includes unlocking the exterior display. This quick and seamless process allows the authorized user to view content, messages, files, and data without having to pivot the first device housing 102 and the second device housing 103 to the axially displaced open position.

Embodiments of the disclosure advantageously use the same fingerprint sensor, i.e., fingerprint sensor 106 situated beneath display 120 to also unlock the other display(s), e.g., display (105), as well. Turning now to FIG. 4, illustrated therein is one explanatory method 400 depicting how this can occur.

Beginning with step 401, an authorized user 410 is shown holding the electronic device 100 while the electronic device is in the closed position and in the locked mode of operation. This state and geometric form factor of the electronic device 100 is detected at step 402. If, at step 401, the authorized user 410 were to place their thumb atop the fingerprint sensor 106 situated beneath display 120, the method (300) of FIG. 3 would proceed, thereby allowing the authorized user 410 to unlock display 120 as previously described.

In this illustrative embodiment, however, the authorized user 410 pivots the first device housing 102 relative to the second device housing 103 from the closed position of step 401 toward an axially displaced open position at step 403. The electronic device 100 is shown in a partially open position at step 403. In one or more embodiments, this causes another display, here display 105, to be revealed as shown at step 403. Thus, as shown at step 403, in one or more embodiments the electronic device 100 includes a first device housing 102 that is pivotable relative to the second device housing between the closed position of step 401 and the axially displaced open position shown in step 405. In one or more embodiments, this reveals display 105, which was concealed when the electronic device 100 was in the closed position of step 401. In one or more embodiments, one or more sensors (115) of the electronic device detect this transition from a first geometric form factor to a second geometric form factor at step 404.

At step 405, the authorized user 410 delivers fingerprint data to the fingerprint sensor 106 situated beneath display 120, which is exposed for all geometric form factors of the electronic device. At step 403, the authorized user 410 delivers this fingerprint data to the fingerprint sensor 106 situated beneath display 120 while the electronic device is in the the axially displaced open position.

At step 406, the fingerprint sensor 106 situated beneath the display 120 receives fingerprint data from the finger touching the display 120 at a location that is collocated with the fingerprint sensor 106. At step 407, one or more processors (110) of the electronic device then authenticate that this fingerprint data is received from the authorized user 410 of the electronic device.

At step 408, the one or more processors (110) further select between display 120 and display 105. This selection can occur as a function of a variety of factors, which can be used alone or in combination. Illustrating by example, in one or more embodiments the one or more processors (110) select between display 120 and display 105 as a function of the geometric form factor illustrated, and optionally detected, at step 408. In other embodiments, the one or more processors (110) select between display 120 and display 105 as a function of the transition between geometric form factors detected at step 404. Using either option as a function input, since first device housing 102 and the second device housing 103 of the electronic device 100 are pivoted to the axially displaced open position at step 405 when the fingerprint data is received, the one or more processors (110) select the display 105 at step 408.

At step 408, the one or more processors (110) of the electronic device 100 also unlock the selected display, which is display 105 in this illustrative example. In one or more embodiments, this unlocking of display 105 occurs in response to authenticating the authorized user of the electronic device. In another embodiment this unlocking of display 105 occurs in response to a combination of authenticating the authorized user of the electronic device and detecting the axially displaced open position occurring when the fingerprint data is being received. In still another embodiment, this unlocking of display 105 occurs in response to authenticating the authorized user of the electronic device and detecting a transition of the geometric form factor from the closed position to the axially displaced open position. Display 105 is then shown unlocked at step 409. In the active mode of operation, the display 105 is available to present content to the authorized user 410.

In one or more embodiments, the one or more processors (110) of the electronic device 100 unlock the selected display without unlocking other displays of the electronic device 100. For instance, in one or more embodiments step 408 comprises the one or more processors (110) of the electronic device 100 unlocking display 105 without unlocking display 120 when the electronic device 100 is in the axially displaced open position shown at step 409.

Advantageously, the method 300 depicted in FIG. 3 allows an authorized user of the electronic device to simply touch the exterior display with a finger to unlock the electronic device 100, which includes unlocking the exterior display. This quick and seamless process allows the authorized user to view content, messages, files, and data without having to pivot the first device housing 102 and the second device housing 103 to the axially displaced open position.

Embodiments of the disclosure contemplate that if the authorized user 410 is looking at display 105 at step 405, there is a chance that the finger may miss the fingerprint sensor 106 due to the fact that the fingerprint sensor 106 is situated on the opposite side of the electronic device 100 from display 105 and not in the line of sight of the authorized user 410. Embodiments of the disclosure also contemplate that when the fingerprint sensor 106 is situated beneath display 120, it may be difficult for the authorized user 410 to mechanically locate the fingerprint sensor 106 due to the fact that there is no tactile feature, e.g., a protrusion, indentation, ridges, or other feature on the surface of display 120 that allows the user to make a tactile determination when the finger is atop the fingerprint sensor 106.

Figure 5:
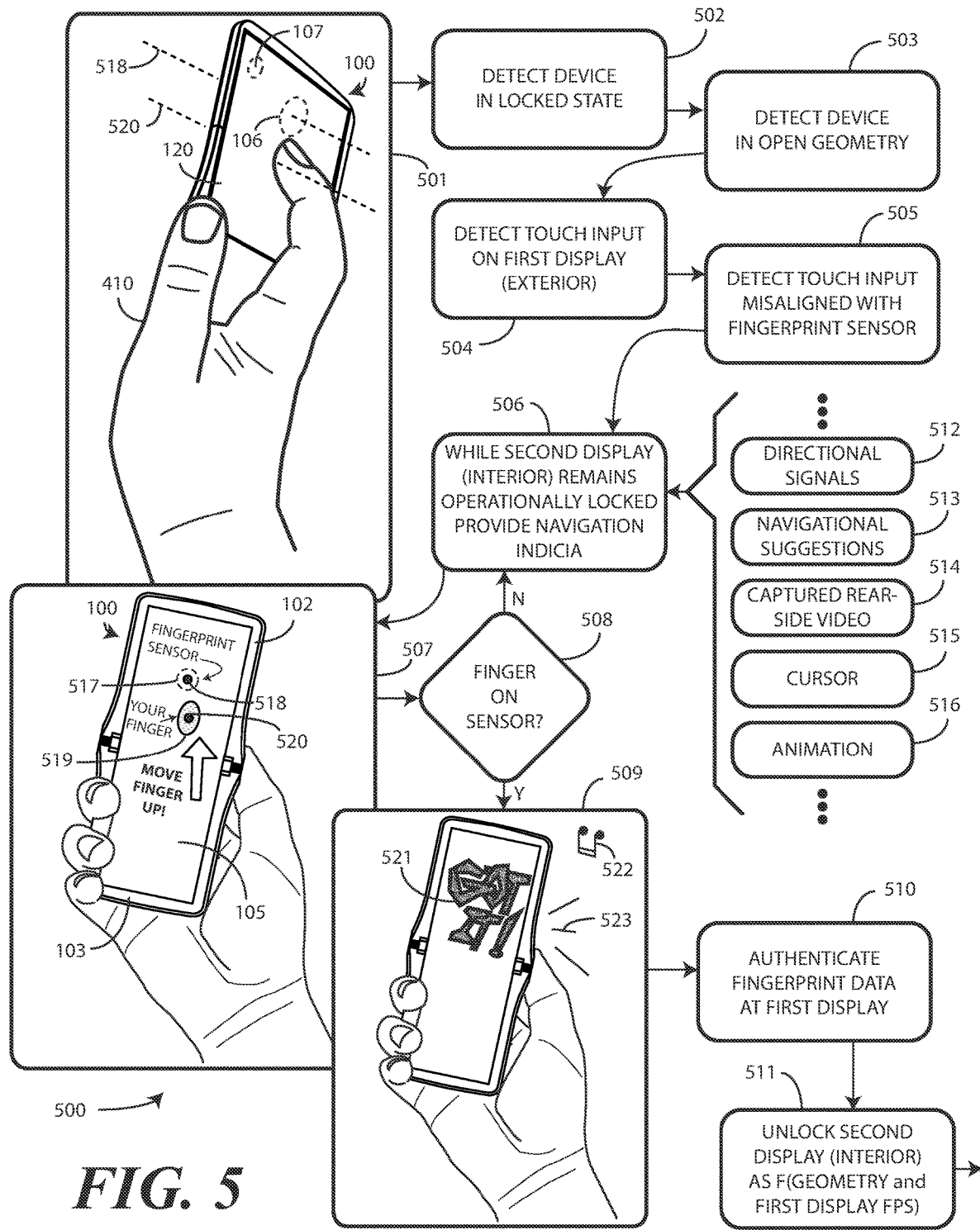
FIG. 5 illustrates one or more explanatory method steps in accordance with one or more embodiments of the disclosure.

To solve this problem, in one or more embodiments redirection indicia is presented to the authorized user 410 on display 105 when their finger inadvertently misses the area of display 120 beneath which the fingerprint sensor 106 is situated. This redirection indicia, which can comprises a visible marker, one or more images, or navigational instructions, allows the authorized user 410 to quickly and easily find the proper location of the fingerprint sensor 106 positioned under the display 120 to unlock the display 105 when the electronic device 100 is in the axially displaced open position. Turning now to FIG. 5, illustrated therein is one explanatory method 500 illustrating how this can occur.

Beginning at step 501, the authorized user 410 has inadvertently missed the fingerprint sensor 106 while trying to unlock display 105 with the electronic device 100 in the axially displaced open position. This fact is determined at steps 502-505. At step 502, one or more processors (110) of the electronic device 100 determine that the electronic device 100 is in a locked mode of operation. At step 503, one or more sensors (115) of the electronic device 100 determine a geometric form factor of the electronic device 100. As shown at step 501, the geometric form factor is the axially displaced open position.

At step 504, display 120 detects the receipt of touch input. Since it is likely that the touch input may be delivering fingerprint data due to the fact that the electronic device 100 is in the locked mode of operation, in one or more embodiments the one or more processors (110) of the electronic device 100 actuate the fingerprint sensor 106 and, optionally, causes the transparent organic light emitting diode pixels or sub-pixels situated atop the fingerprint sensor 106 to cease emitting light. This cessation of light emission prevents light emitted from the transparent organic light emitting diode pixels or sub-pixels from interfering with the fingerprint data incident upon the first pixel portion of display 120 situated above the fingerprint sensor 106. When the transparent organic light emitting diode pixels or sub-pixels are turned OFF, they become optically transparent in one or more embodiments, thereby allowing the fingerprint sensor 106 to capture the fingerprint data. As noted above, in some embodiments the second pixel portion of display 120 will be ON in response to the touch input detected at step 504 when the first pixel portion ceases to emit light. However, in other embodiments the second pixel portion will be turned OFF as well. The fingerprint sensor 106 can then attempt to capture the fingerprint data through the transparent organic light emitting diode pixels or sub-pixels.

At step 505, the one or more processors (110) detect, with touch sensors of display 120, that the touch input detected at step 504 is missing an area of display 120 that is collocated with the fingerprint sensor 106. In the illustrative embodiment of FIG. 5, this occurs while the electronic device 100 is in the axially displaced open position, as determined by step 503.

To assist the authorized user 410 in locating the fingerprint sensor 106 without having to turn the electronic device 100 over, in one or more embodiments the one or more processors (110) of the electronic device 100 present redirection indicia upon display 105. In one or more embodiments, the redirection indicia directs the touch input toward the are of display 120 that is collocated with the fingerprint sensor 106.

The redirection indicia can take a variety of forms, several examples of which are illustrated at step 507. Illustrating by example, in one or more embodiments the redirection indicia comprise a visible marker 517 identifying an area of display 120 concentrically located about an axis 518 passing orthogonally through the first device housing 102 with the area of display 120 that is collocated with the fingerprint sensor 106. This axis 518 is shown in both step 501 and step 507.

In one or more embodiments, the redirection indicia comprise a visible marker 519 identifying another area of display 120 concentrically located about another axis 520 passing orthogonally through the first device housing 102 collocated with the touch input. This axis 520 is shown in both step 501 and step 507. Of course, the visible marker 517 identifying the area of display 120 concentrically located about axis 518 and the visible marker 519 identifying the other area of display 120 concentrically located about axis 520 can be used in combination as well, as shown at step 507.

Additionally, while visible marker 517 and visible marker 519 are shown as circular and ovular shapes, respectively, at step 507, these visible markers 517,519 can take other shapes as well. In another embodiment, these visible markers 517,519 can be square. In another embodiment, these visible markers 517,519 can be configured as stars. In another embodiment, these visible markers 517,519 are rectangular. In another embodiment, these visible markers 517,519 are polygonal. In another embodiment, these visible markers 517,519 are a free form shape. These visible markers 517,519 can be the same shape, or can be different shapes. Moreover, still other shapes for these visible markers 517,519 will be obvious to those of ordinary skill in the art having the benefit of this disclosure.

In one or more embodiments, the redirection indicia can comprise directional signals 512. As shown at step 501, the finger of the authorized user 401 has missed the fingerprint sensor 106 to the low side. Accordingly, to assist the authorized user 410 in locating the fingerprint sensor 106 quickly and simply, the one or more processors (110) of the electronic device 100 present a directional signal 512 in the form of an arrow pointing up to alert the authorized user 410 to the fact that the finger should be moved up to align with the area of display 120 situated atop the fingerprint sensor 106.

In one or more embodiments, the redirection indicia can comprise navigational suggestions 513. These navigational instructions can include symbols, graphics, text, or a combination of one or more of these instructing where the touch input should be relocated so as to align with the fingerprint sensor 106. In the illustrative embodiment of FIG. 5, the navigational suggestions 513 comprise the words "move finger up!" Other examples of navigational suggestions 513 will be obvious to those of ordinary skill in the art having the benefit of this disclosure.

In one or more embodiments, the redirection indicia comprise one or more images 514 of the object causing the touch input to occur at display 120, which in this example is the user's finger. Recall from above that in one or more embodiments, the electronic device includes an image capture device 107 situated beneath, or beside, display 120. In one or more embodiments, the image capture device 107 captures one or more images 514 with a field of view within which the authorized user's finger is located. The one or more processors (110) of the electronic device 100 can then superimpose and indication of the location of the fingerprint sensor 106, such as the visible marker 517 identifying the area of display 120 concentrically located about axis 518, upon the one or more images 514 and then present the modified images to the authorized user 410 on display 105.

Where the redirection indicia comprise the one or more images 514, which can be any of still images, a series of still images, or video, such redirection indicia serves as a virtual "x-ray window" that allows a person to virtually look "through" the electronic device 100 to determine where to position their finger to unlock display 105. This x-ray window provides instantaneous and accurate feedback with respect to touch interactions occurring on the display 120. When used in conjunction with the visible marker 517 identifying the area of display 120 concentrically located about axis 518, it further indicates the target touch occurring on the display 120 by showing the same on the display 105.

In one or more embodiments, the redirection indicia comprise a cursor 515 that is concentrically located about axis 520. The cursor 515, which can be configured as a halo, a cross hair, a spyglass, a magnifying glass, a visible indicator, or by other techniques, identifies where the authorized user's finger is touching display 120.

In still another embodiment, the redirection indicia comprise an animation 516. The animation 516 may take the form of a cartoon or other video snippet that instructs the authorized user 410 to move their finger upward so as to touch display 120 at a location collocated with the fingerprint sensor 106. These examples of redirection indicia are illustrative only, as other examples will be obvious to those of ordinary skill in the art having the benefit of this disclosure.

Thus, as shown at step 507, when fingerprint data is received at an area of display 120 that is off target from another area of display 120 that is collocated with the fingerprint sensor 106, in one or more embodiments the one or more processors (110) of the electronic device 100 present redirection indicia identifying locations of both the fingerprint data and the fingerprint sensor 106 on display 105 so that the authorized user 410 can easily find the fingerprint sensor 106. Step 507 advantageously presents redirection indicia on display 105 when display 120 receives touch input missing an area of display 120 that is collocated with the fingerprint sensor 106 while the first device housing 102 and the second device housing 103 are in the axially displaced open position.

Moreover, it should be noted that in the illustrative embodiment of FIG. 5, the redirection indicia is presented upon display 105 while display 105 remains in the locked mode of operation. Thus, while the redirection indicia is visible, access to other content stored within the electronic device 100 or accessible by the electronic device 100 is precluded until display 105 is unlocked or transitioned to the active mode of operation.

At decision 508, the one or more processors (110) of the electronic device 100 determine whether the finger has been successfully moved to a location along display 120 that is collocated with the fingerprint sensor 106. Where it has not, the redirection indicia can be revised at step 506 and presented anew at step 507.

Where the finger has become collocated with the fingerprint sensor 106, the one or more processors (110) may optionally deliver a verification notification to the authorized user 410 at step 509. The verification notification, like the redirection indicia, can take a variety of forms. Three examples are illustrated at step 509. Others will be obvious to those of ordinary skill in the art having the benefit of this disclosure.

In one or more embodiments, the verification notification comprises a prompt 521 that is presented on display 105. In one or more embodiments, the prompt 521 is indicative of the finger successfully becoming collocated with an area of display 120 that is atop the fingerprint sensor 106. In this illustrative example, the prompt 521 says, "Got it!" However, other examples of prompts will be obvious to those of ordinary skill in the art having the benefit of this disclosure.

In another embodiment, the verification notification comprises an audible output 522. The one or more processors (110) of the electronic device 100 may cause an audio output device, such as a loudspeaker, to play a tone, chime, or music indicative of the finger successfully becoming collocated with an area of display 120 that is atop the fingerprint sensor 106.

In still another embodiment, the verification notification comprises a haptic output 523. The haptic output 523 can comprise a response that the authorized user 410 feels with their finger. Illustrating by example, the haptic output 523 can be delivered as a "click" or "pop" that can be felt at display 120. A motion generation device situated within the electronic device 100 can deliver the haptic output 523 at a localized location in one or more embodiments.

As with the redirection indicia, the various verification notifications can be used alone or in combination. For instance, in one or more embodiments the one or more processors (110) will output a combination of the prompt 521 and the haptic output 523 when the finger of the authorized user 410 becomes collocated with the fingerprint sensor 106. Other configurations will be obvious to those of ordinary skill in the art having the benefit of this disclosure.

At step 510, the fingerprint sensor 106 situated under display 120 receives the fingerprint data while the electronic device 100 is in the axially displaced open position. At step 510, the one or more processors (110) of the electronic device 100 authenticate the authorized user 410 of the electronic device 100 using the fingerprint data. Thereafter, the one or more processors (110) can actuate the transparent organic light emitting diode pixels or sub-pixels of display 120 that are situated above the fingerprint sensor 106, thereby causing them to again begin emitting light.

At step 511, the one or more processors unlock display 105 in response to authenticating the authorized user 410 of the electronic device 100. Said differently, at step 511, the one or more processors (110) unlock display 105 when the fingerprint sensor 106 situated beneath display 120 receives fingerprint data authenticating the authorized user 410 of the electronic device 100 while the first device housing 102 and the second device housing 103 are in the axially displaced open position.

The way that the authorized user 410 is holding the electronic device 100 in FIG. 5 illustrates another feature provided by embodiments of the disclosure. As can be seen at step 501, when the electronic device 100 is in the axially displaced open position it is highly likely that the authorized user 410 will use their index finger to unlock display 105. To be sure, it would be awkward and difficult for the authorized user 410 to reach the fingerprint sensor 106 with their thumb at step 501. With this in mind, embodiments of the disclosure can be configured to prioritize authenticating the authorized user 410 with the forefinger when the electronic device 100 is in the axially displaced open position. One example of how this can occur is illustrated in FIG. 6.

Figure 6:
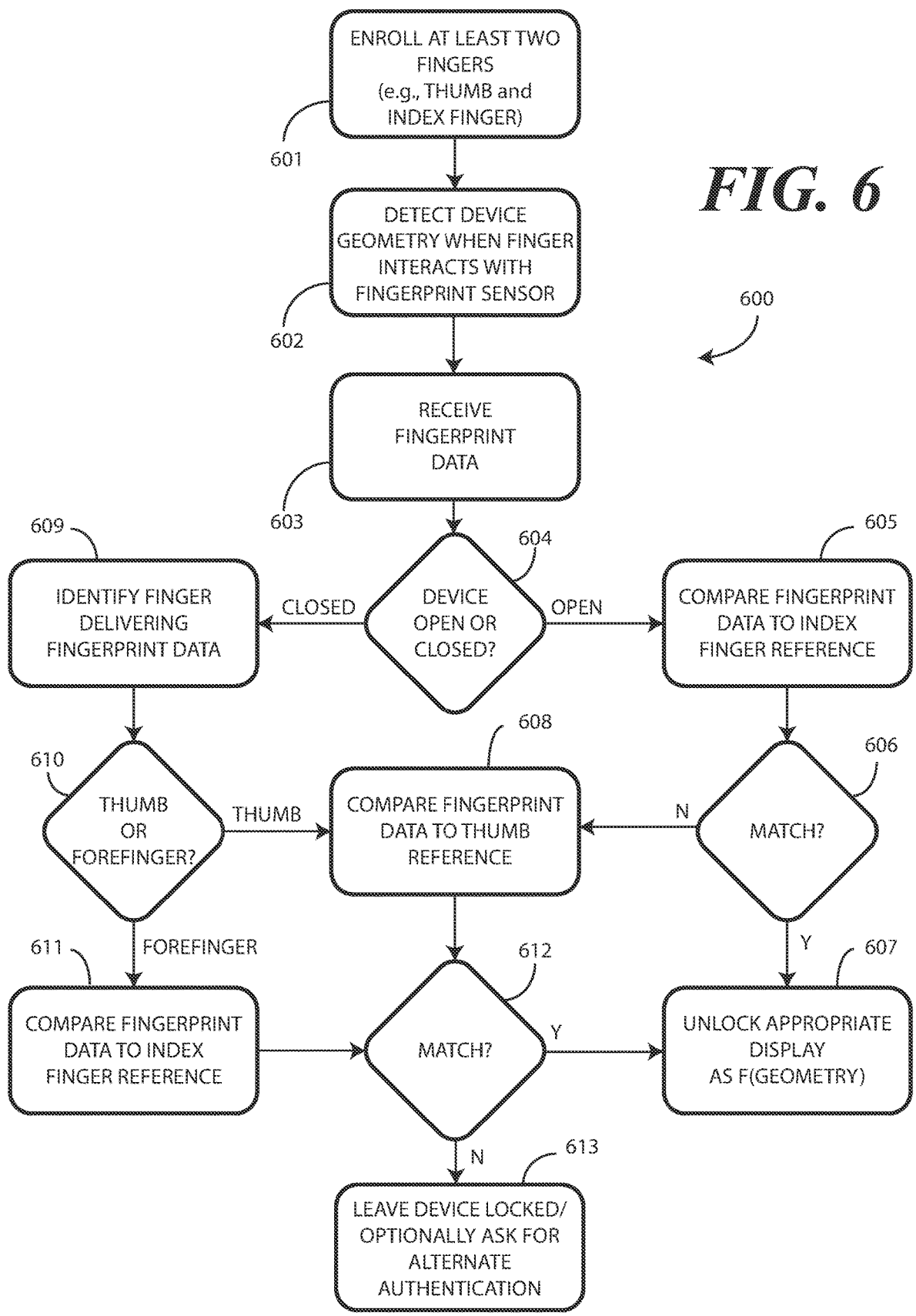
FIG. 6 illustrates still another explanatory method in accordance with one or more embodiments of the disclosure.

Turning now to FIG. 6, illustrated therein is one explanatory method 600 for more efficiently authenticating an authorized user of an electronic device with a fingerprint sensor in accordance with one or more embodiments of the disclosure. The method 600 of FIG. 6 prioritizes authentication of a forefinger when the electronic device is in the axially displaced open position, and allows for authentication to equally occur with a thumb, forefinger, or other finger when the electronic device is in the closed position. While multiple fingers can be used for authentication regardless of geometric form factor of the electronic device, prioritizing the forefinger when the electronic device is in the axially displaced open position saves processor cycles in the authentication process to provide a more instantaneous authentication operation.

At step 601 and authorized user of the electronic device completes an enrollment process at the electronic device by delivering fingerprint data to the fingerprint sensor so that the fingerprint data can be captured and stored as one or more fingerprint data reference files in the memory of the electronic device. In one or more embodiments, the authorized user enrolls fingerprint data corresponding to at least two fingers at step 601. Illustrating by example, the authorized user may first enroll a forefinger due to the fact that the forefinger is well positioned to deliver fingerprint data to the fingerprint sensor when the electronic device is in the axially displaced open position shown in FIGS. 4-5 above. The authorized user may then enroll fingerprint data from a second finger, such as a thumb, because the thumb can conveniently be used when the electronic device is in the closed position of FIG. 3 and the authorized user is holding the electronic device with their fingers supporting the second device housing with their thumb placed on the first device housing. Additional fingers can be enrolled at step 601 as well.

In one or more embodiments, the one or more processors navigate the authorized user through the enrollment process at step 601. Illustrating by example, the authorized user may first be required to identify himself or herself as the authorized user by entering an authentication credential. The one or more processors may prompt for the authorized user to enter a passcode at step 601 for example. Other techniques allowing for the authorized user to initially identify himself or herself as the authorized user of the electronic device will be obvious to those of ordinary skill in the art having the benefit of this disclosure.

The one or more processors may then present a series of prompts informing the authorized user how to enroll the at least two fingers at step 601. In one or more embodiments, the one or more processors present a message instructing the authorized user to first find the sensor, which is situated beneath a display that is continually exposed regardless of geometric form factor in one or more embodiments. This instruction can include the presentation of redirection indicia as previously described. When the authorized user locates the fingerprint sensor, in one or more embodiments the one or more processors present a verification notification as also described above.

Thereafter, the one or more processors may request that the authorized user place their finger atop a location of the exterior display multiple times so that a sufficient amount of fingerprint data is captured to be used as a fingerprint reference data file. Accordingly, the one or more processors may present a prompt instructing the authorized user to lift their finger and then again touch the location of the exterior display situated atop the fingerprint sensor multiple times. The one or more processors may request that the authorized user move their finger slightly. Once the enrollment process is complete, another verification notification may be presented informing the authorized user of the same. Other techniques for performing an enrollment process will be obvious to those of ordinary skill in the art having the benefit of this disclosure.

At step 602, one or more sensors of the electronic device determine a geometric form factor of the electronic device. In one or more embodiments, the one or more sensors of the electronic device determine the geometric form factor while a finger is interacting with the display positioned above the fingerprint sensor.

At step 603, the fingerprint sensor receives fingerprint data. Decision 604 then determines from the geometric form factor whether the electronic device is in the axially displaced open position or in the closed position. Where the electronic device is in the axially displaced open position, the method 600 moves to step 605 where the forefinger is prioritized.

Since the authorized user enrolled at least two fingers at step 601, the memory of the electronic device stores a plurality of fingerprint reference data files. Illustrating by example, if the authorized user enrolls the thumb and forefinger at step 601, the memory will store a forefinger fingerprint reference data file and a thumb fingerprint reference data file. If the authorized user enrolls additional fingers, the memory will store additional fingerprint reference data files, and so forth.

At step 605, the one or more processors prioritize the forefinger by comparing the fingerprint data received at step 603 with the forefinger fingerprint data reference file stored in the memory of the electronic device before comparing the fingerprint data to any other fingerprint reference data files stored in the memory whenever the first device housing and the second device housing are in the axially displaced open position. Said differently, in one or more embodiments step 605 comprises comparing the fingerprint data received at step 603 first to the forefinger fingerprint reference data file. If the fingerprint data substantially matches the forefinger fingerprint reference data file, as determined at decision 606, the one or more processors unlock the interior display. In one or more embodiments, this occurs when the fingerprint sensor situated beneath the exterior display receives the fingerprint data while the first device housing and the second device housing are in the axially displaced open position. Otherwise, the method 600 moves to step 608 where additional fingerprint reference data files are compared to the fingerprint data until a match is determined at step 611. If no match is ever made, the electronic device and its displays remain locked at step 613. The one or more processors can optionally prompt for an alternate authentication credential at step 613 in one or more embodiments.

In contrast to this prioritization of the forefinger occurring when the electronic device is in the axially displaced open position, when the electronic device is in the closed position multiple fingers can equally be used to authenticate the authorized user. While this is ultimately true as well in the axially displaced open position, the left side of the method 600 of FIG. 6 uses additional processor cycles, thereby making it slower than the right side of the method 600 of FIG. 6.

To wit, when the electronic device is in the closed position, an additional step of identifying the type of fingerprint data occurs at step 609. The one or more processors analyze the fingerprint data to determine which finger provided the same at decision 610. Using a thumb and forefinger as an illustrative example, if decision 610 determines the finger supplying the fingerprint data is a thumb, this fingerprint data is compared to a thumb fingerprint reference data file at step 608 to determine if it substantially matches the same. By contrast, if the if decision 610 determines the finger supplying the fingerprint data is a forefinger, this fingerprint data is compared to a forefinger fingerprint reference data file at step 608 to determine if it substantially matches the same. If a match is made, the exterior display is unlocked at step 607. If no match is ever made, the electronic device and its displays remain locked at step 613. The one or more processors can optionally prompt for an alternate authentication credential at step 613 in one or more embodiments.

Accordingly, to streamline and make the process of user authentication more efficient, the method 600 of FIG. 6 authenticate the authorized user of the electronic device by comparing the fingerprint data to a forefinger fingerprint reference data file before any other fingerprint reference data files when the electronic device is in the axially displaced open position. By contrast, an additional determination of which finger is being used occurs when the electronic device is in the closed position in one or more embodiments due to the fact that the difference between the probability of the authorized user using a thumb or forefinger (or another finger) is smaller when the electronic device is in the closed position than when the electronic device is in the axially displaced open position.

To this point, explanatory embodiments of the disclosure have provided an electronic device comprising a first device housing that is pivotable relative to a second device housing between a closed position and an axially displaced open position. The electronic device includes a first display that is coupled to the first device housing, with the first display being exposed both when the first device housing and the second device housing are in the closed position and when the first device housing and the second device housing are in the axially displaced open position. A fingerprint sensor is situated beneath the first display.

The electronic device used for illustrative explanation has included a second display that is coupled to the first device housing. The second display is concealed when the first device housing and the second device housing are in the closed position and revealed when the first device housing pivots relative to the second device housing to the axially displaced open position. With the inclusion of these two displays, one or more processors of the electronic device unlock the second display when the fingerprint sensor situated beneath the first display receives fingerprint data authenticating an authorized user of the electronic device while the first device housing and the second device housing are in the axially displaced open position.

Figure 7:
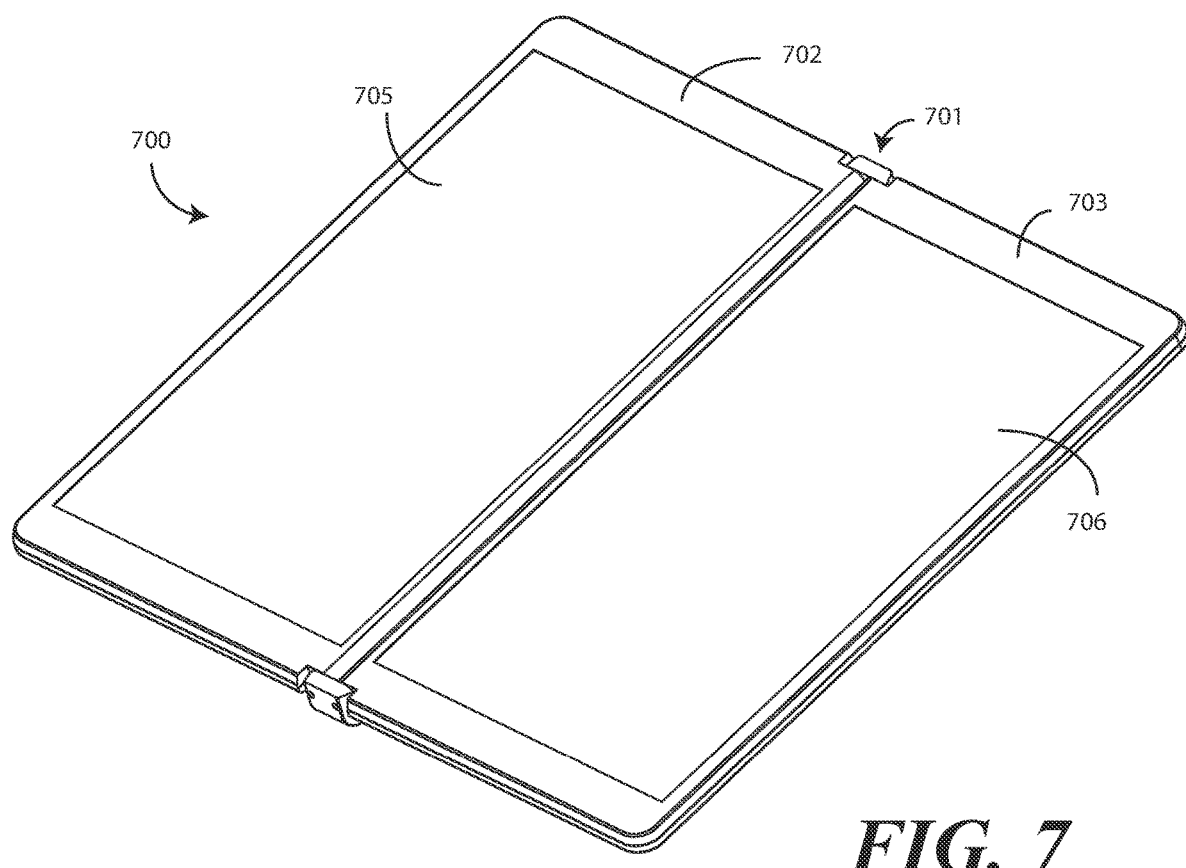
FIG. 7 illustrates another explanatory electronic device in accordance with one or more embodiments of the disclosure.

It should be noted that the electronic device could be configured in numerous other ways as well and still offer the benefits and features described herein. Turning to FIG. 7, illustrated therein is one alternative electronic device configured in accordance with one or more embodiments of the disclosure.

As mentioned above, however, not all electronic devices configured in accordance with embodiments of the disclosure employ flexible displays. FIG. 7 illustrates one embodiment where the flexible display. As shown in FIG. 7, an electronic device 700 includes a first device housing 702 and a second device housing 703. A hinge 701 couples the first device housing 702 to the second device housing 703. The first device housing 702 is pivotable about the hinge 701 relative to the second device housing 703 between an axially displaced open position and a closed position, as previously described.

Rather than having a flexible display, in this embodiment the electronic device 700 includes a first display 705 coupled to the first device housing 702 and a second display 706 coupled to the second device housing 703. Thus, in addition to separating the first device housing 702 from the second device housing 703, the hinge 701 separates the first display 705 from the second display 706 as well.

The unlocking process described above where a fingerprint sensor situated beneath one display unlocks another display when the electronic device 700 is in the axially displaced open position can be used with the electronic device 700 of FIG. 7. If, for example, the fingerprint sensor is positioned beneath the first display 705, in one or more embodiments it can be used to unlock the second display 706. The one or more processors of the electronic device 700 can unlock the second display 706 when the fingerprint sensor situated beneath the first display 705 receives fingerprint data authenticating an authorized user of the electronic device 700 while the first device housing 702 and the second device housing 703 are in the axially displaced open position. If the configuration is reversed, with the fingerprint sensor situated under the second display 706, the opposite can occur with fingerprint data delivered to the fingerprint sensor through the second display 706 unlocking the first display 705, and so forth. Other configurations of electronic devices suitable for use with the unlocking techniques presented herein will be obvious to those of ordinary skill in the art having the benefit of this disclosure.

Figure 8:
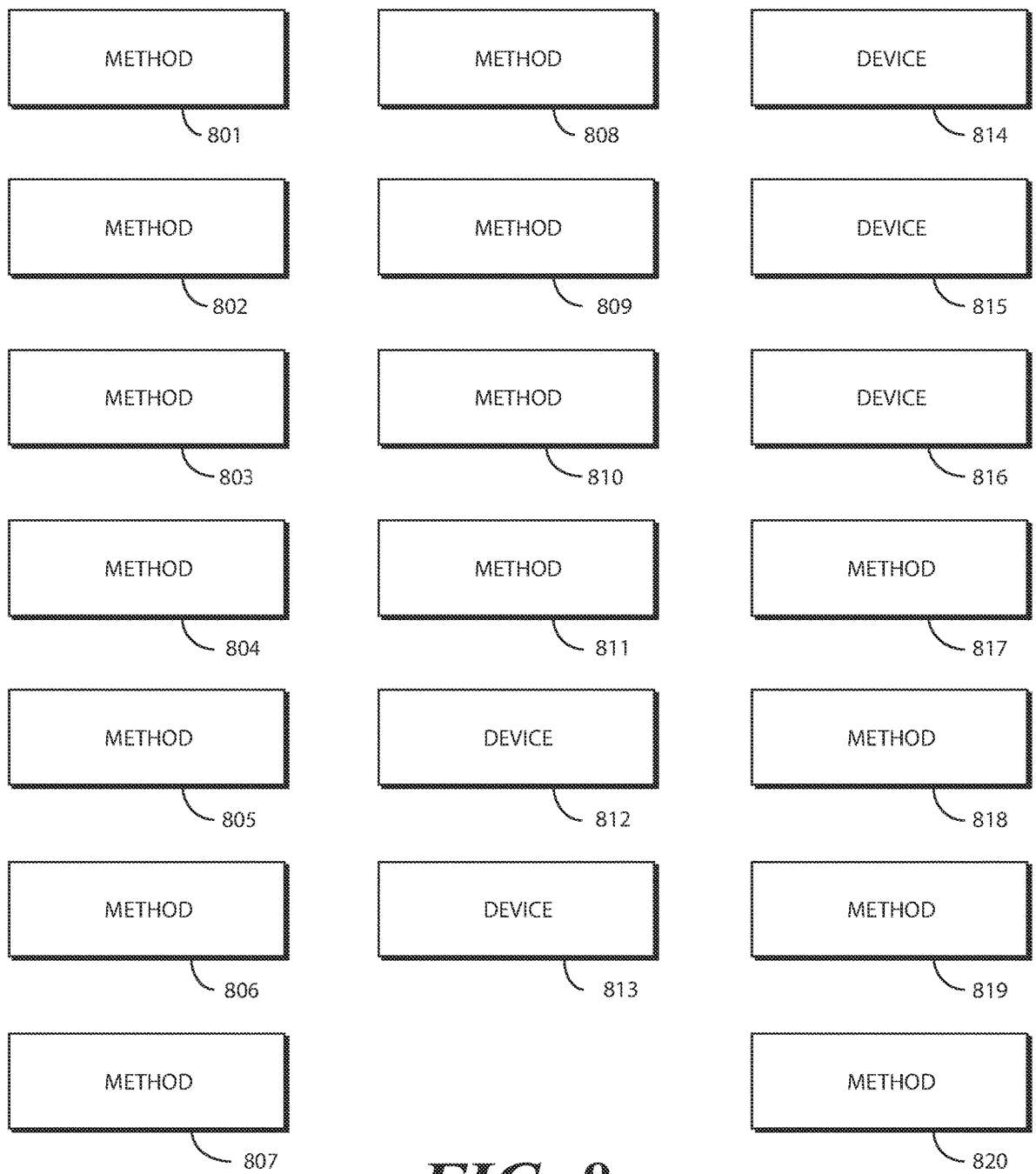
FIG. 8 illustrates one or more embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, a method in an electronic device comprises detecting a geometric form factor of the electronic device with one or more sensors. At 801, the method comprises receiving fingerprint data with a fingerprint sensor situated beneath a first display of the electronic device.

At 801, the method comprises authenticating an authorized user of the electronic device using the fingerprint data with one or more processors. At 801, the method comprises selecting between the first display of the electronic device and a second display of the electronic device as a function of the geometric form factor and unlocking the selected display in response to authenticating the authorized user of the electronic device.

At 802, the first display of 801 is exposed in all geometric form factors of the electronic device and the second display is concealed in at least one geometric form factor of the electronic device. At 803, the electronic device of 802 comprises a first device housing that is pivotable relative to a second device housing between a closed position and an axially displaced open position. At 803, the selecting occurring at 802 between the first display of the electronic device and the second display of the electronic device comprises selecting the first display when the first device housing and the second device housing are pivoted to the closed position. At 804, the unlocking the selected display of 803 comprises unlocking the first display without unlocking the second display.

At 805, the electronic device of 802 comprises a first device housing that is pivotable relative to a second device housing between a closed position and an axially displaced open position. At 805, the selecting between the first display of the electronic device and the second display of the electronic device of 802 comprises selecting the second display when the first device housing and the second device housing are pivoted to the axially displaced open position. At 806, the unlocking occurring at 805 comprises unlocking the second display without unlocking the first display.

At 807, the method of 805 further comprises detecting, with the first display, touch input missing an area of the first display collocated with the fingerprint sensor when the first device housing and the second device housing are in the axially displaced open position and presenting on the second display, with the one or more processors, redirection indicia directing the touch input toward the area of the first display collocated with the fingerprint sensor.

At 808, the redirection indicia of 807 comprises a visible marker identifying an area of the second display concentrically located about an axis passing orthogonally through the first device housing with the area of the first display collocated with the fingerprint sensor. At 809, the redirection indicia of 808 further comprises another visible marker identifying another area of the second display concentrically located about another axis passing orthogonally through the first device housing collocated with the touch input. At 810, the redirection indicia of 808 further comprise one or more images of an object causing the touch input at the first display.

At 811, the authenticating of the authorized user of the electronic device occurring at 805 comprises comparing the fingerprint data with a forefinger fingerprint data reference file stored in a memory of the electronic device before comparing the fingerprint data to any other fingerprint reference data files stored in the memory whenever the first device housing and the second device housing are in the axially displaced open position.

At 812, an electronic device comprises a first device housing that is pivotable relative to a second device housing between a closed position and an axially displaced open position. At 812, the electronic device comprises a first display that is coupled to the first device housing. At 812, the first display is exposed both when the first device housing and the second device housing are in the closed position and when the first device housing and the second device housing are in the axially displaced open position. At 812, a fingerprint sensor is situated beneath the first display.

At 812, the electronic device comprises a second display that is coupled to the first device housing. At 812, the second display is concealed when the first device housing and the second device housing are in the closed position and revealed when the first device housing pivots relative to the second device housing to the axially displaced open position.

At 812, one or more processors of the electronic device unlock the second display when the fingerprint sensor situated beneath the first display receives fingerprint data authenticating an authorized user of the electronic device while the first device housing and the second device housing are in the axially displaced open position.

At 813, the one or more processors of 812 unlock the first display when the first device housing and the second device housing are in the closed position and the fingerprint sensor situated beneath the first display receives the fingerprint data authenticating the authorized user of the electronic device.

At 814, the one or more processors of 812 present redirection indicia on the second display when the first display receives touch input missing an area of the first display collocated with the fingerprint sensor while the first device housing and the second device housing are in the axially displaced open position.

At 815, the electronic device of 814 further comprises an imager coupled to a major face of the first device housing to which the first display is coupled. At 815, the redirection indicia comprise one or more images captured by the imager.

At 816, the electronic device of 812 further comprises a memory operable with the one or more processors. At 816, the memory stores a plurality of fingerprint reference data files.

At 816, the one or more processors unlock the second display when the fingerprint data substantially matches a forefinger fingerprint reference data file when the fingerprint sensor situated beneath the first display receives the fingerprint data while the first device housing and the second device housing are in the axially displaced open position.

At 817, a method in an electronic device comprises detecting a locked state of the electronic device with one or more processors. At 817, the method comprises detecting a first device housing of the electronic device pivoting relative to a second device housing of the electronic device from a closed position to an axially displaced open position.

At 817, the method comprises receiving, while the electronic device is in the axially displaced open position, fingerprint data with a fingerprint sensor situated beneath a first display of the electronic device that is exposed when the electronic device is in the closed position. At 817, the method comprises authenticating an authorized user of the electronic device using the fingerprint data with the one or more processors and unlocking, while the electronic device is in the axially displaced open position, a second display that is revealed when the first device housing pivots relative to the second device housing from the closed position to the axially displaced open position in response to authenticating the authorized user of the electronic device.

At 818, the method of 817 comprises the one or more processors presenting redirection indicia on the second display when the fingerprint data is received at an area of the first display that is off target from another area of the first display that is collocated with the fingerprint sensor. At 819, the redirection indicia of 818 identify locations of both the area and the other area of the first display on the second display. At 820, the method of 817 comprises the one or more processors authenticating the authorized user of the electronic device by comparing the fingerprint data to a forefinger fingerprint reference data file before any other fingerprint reference data files when the electronic device is in the axially displaced open position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving fingerprint data with a fingerprint sensor;
   selecting, with one or more processors, between a first display of the electronic device and a second display of the electronic device as a function of a geometric form factor of the electronic device; and
   unlocking the selected display in response to receiving the fingerprint data.

2. The method of claim 1, wherein the fingerprint sensor is situated beneath the first display of the electronic device.

3. The method of claim 2, further comprising detecting, with the first display, touch input missing an area of the first display collocated with the fingerprint sensor and presenting on the second display, with the one or more processors, redirection indicia.

4. The method of claim 3, the redirection indicia directing the touch input toward the area of the first display collocated with the fingerprint sensor.

5. The method of claim 1, wherein the first display is exposed in all geometric form factors of the electronic device.

6. The method of claim 1, wherein the second display is concealed in at least one geometric form factor of the electronic device.

7. The method of claim 1, the selecting between the first display of the electronic device and the second display of the electronic device comprising selecting the first display when the geometric form factor comprises a closed position.

8. The method of claim 1, wherein the unlocking the selected display comprises unlocking the first display without unlocking the second display.

9. The method of claim 1, the selecting between the first display of the electronic device and the second display of the electronic device comprising selecting the second display when the geometric form factor comprises an axially displaced open position.

10. The method of claim 1, further comprising authenticating, with the one or more processors, the fingerprint data by comparing the fingerprint data with a forefinger fingerprint data reference file stored in a memory of the electronic device.

11. The method of claim 10, wherein the comparing of the fingerprint data with the forefinger fingerprint data reference file occurs before comparing the fingerprint data to any other fingerprint reference data files stored in the memory.

12. An electronic device, comprising:
   a first display that is exposed when the electronic device is in either a closed position or an axially displaced open position;
   a fingerprint sensor;
   a second display that is concealed when the electronic device is in the closed position and revealed when the electronic device is in the axially displaced open position; and
   one or more processors unlocking the second display when the fingerprint sensor receives fingerprint data while the electronic device is in the axially displaced open position.

13. The electronic device of claim 12, the one or more processors unlocking the first display when the fingerprint sensor receives the fingerprint data authenticating a user of the electronic device while the electronic device is in the closed position.

14. The electronic device of claim 12, the one or more processors presenting redirection indicia on the second display when the fingerprint data misses the fingerprint sensor.

15. The electronic device of claim 14, further comprising an imager, wherein the redirection indicia comprises one or more images captured by the imager.

16. The electronic device of claim 12, further comprising a memory operable with the one or more processors and storing a plurality of fingerprint reference data files comprising at least a forefinger fingerprint reference data file and a thumb fingerprint reference data file.

17. A method in an electronic device, the method comprising:
   detecting a first device housing of the electronic device pivoting relative to a second device housing of the electronic device from a closed position to an axially displaced open position;
   receiving, while the electronic device is in the axially displaced open position, fingerprint data with a fingerprint sensor; and
   unlocking, while the electronic device is in the axially displaced open position, a second display of the electronic device in response to receiving the fingerprint data.

18. The method of claim 17, wherein the first display of the electronic device is exposed when the electronic device is in the closed position.

19. The method of claim 17, wherein the second display is revealed when the first device housing pivots relative to the second device housing from the closed position to the axially displaced open position.

20. The method of claim 17, wherein the fingerprint sensor is situated beneath the first display.

* * * * *